US008649736B2

(12) United States Patent  
Descombes et al.

(10) Patent No.: US 8,649,736 B2
(45) Date of Patent: Feb. 11, 2014

(54) OPERATION TEST METHOD FOR A CIRCUIT FOR TRANSMITTING AND RECEIVING SIGNALS

(75) Inventors: Arthur Descombes, Kerzers (CH); Tindaro Pittorino, Marin-Epagnier (CH)

(73) Assignee: EM Microelectronic-Marin SA, Marin (CH)

( * ) Notice: Subject to any disclaimer, the term of this patent is extended or adjusted under 35 U.S.C. 154(b) by 597 days.

(21) Appl. No.: 12/829,917

(22) Filed: Jul. 2, 2010

(65) Prior Publication Data

US 2011/0003564 A1 Jan. 6, 2011

(30) Foreign Application Priority Data

Jul. 6, 2009 (EP) ..................................... 09164691

(51) Int. Cl.
*H04B 17/00* (2006.01)

(52) U.S. Cl.
USPC ..................... 455/67.14; 455/67.11; 455/423; 455/84; 455/78; 455/115.1; 455/115.2; 455/115.3; 340/679; 375/221; 398/9; 398/182

(58) Field of Classification Search
USPC ................ 455/67.14, 67.11, 423, 424, 115.1, 455/115.2, 115.3, 78, 84; 340/679; 375/221; 398/9, 182
See application file for complete search history.

(56) References Cited

U.S. PATENT DOCUMENTS

| | | | | |
|---|---|---|---|---|
| 5,787,114 A | * | 7/1998 | Ramamurthy et al. | 375/221 |
| 5,956,370 A | * | 9/1999 | Ducaroir et al. | 375/221 |
| 6,034,948 A | * | 3/2000 | Nakamura et al. | 370/246 |
| 6,882,827 B1 | * | 4/2005 | Collier | 455/67.11 |
| 7,057,518 B2 | * | 6/2006 | Schmidt | 340/635 |
| 7,177,600 B2 | * | 2/2007 | Kang et al. | 455/67.11 |
| 7,203,460 B2 | * | 4/2007 | Boose et al. | 455/67.11 |
| 7,286,802 B2 | * | 10/2007 | Beyme et al. | 455/67.14 |
| 7,323,884 B2 | * | 1/2008 | Stojcevic | 324/627 |
| 7,379,716 B2 | * | 5/2008 | Eisenstadt et al. | 455/126 |
| 7,463,140 B2 | * | 12/2008 | Schmidt | 340/514 |
| 7,653,356 B2 | * | 1/2010 | Kerth et al. | 455/67.14 |

(Continued)

FOREIGN PATENT DOCUMENTS

WO 02/13427 A1 2/2002

OTHER PUBLICATIONS

Kay Suenaga, et al., "A Module for BiST of CMOS RF Receivers", Journal of Electronic Testing, pp. 605-612, Oct. 2007, vol. 23, No. 6.

*Primary Examiner* — Marceau Milord
(74) *Attorney, Agent, or Firm* — Sughrue Mion, PLLC

(57) ABSTRACT

The invention concerns a test method for a transmitter-receiver circuit. This transmitter-receiver circuit includes an antenna, connected to a processing unit, arranged for receiving signals and converting their frequency. The transmitter-receiver circuit also includes a power amplifier connected to said antenna and arranged for sending transmission signals. The transmitter-receiver circuit also includes a test module, characterized in that it includes the steps consisting in:
  a) electrically connecting the test module to the processing unit of the transmitter-receiver circuit;
  b) testing the operation of the transmitter-receiver circuit in a first operating mode, which can be either a data transmission mode or a data reception mode, using the test module;
  c) testing the operation of the transmitter-receiver circuit in a second operating mode, which can be either a data reception mode or a data transmission mode, using the test module; and
  d) electrically disconnecting the test module from the processing unit.

12 Claims, 1 Drawing Sheet

(56) References Cited

U.S. PATENT DOCUMENTS

| | | | |
|---|---|---|---|
| 7,697,928 B2* | 4/2010 | Shvodian et al. | 455/423 |
| 7,783,261 B2* | 8/2010 | Peng et al. | 455/67.11 |
| 7,880,670 B2* | 2/2011 | Villarroel et al. | 342/165 |
| 7,933,559 B2* | 4/2011 | Stojcevic | 455/67.12 |
| 8,112,043 B2* | 2/2012 | Knudsen et al. | 455/67.14 |
| 8,140,031 B2* | 3/2012 | Tsfati et al. | 455/114.3 |
| 2006/0217085 A1 | 9/2006 | Eisenstadt et al. | |
| 2008/0144707 A1 | 6/2008 | Tsfati et al. | |

\* cited by examiner

OPERATION TEST METHOD FOR A CIRCUIT FOR TRANSMITTING AND RECEIVING SIGNALS

The present invention concerns generally a test method for a transmitter-receiver circuit. This transmitter-receiver circuit includes an antenna, connected to a processing unit, arranged for receiving signals and converting their frequency. The transmitter-receiver circuit also includes a power amplifier, which is connected to said antenna and arranged for sending transmission signals. The transmitter-receiver circuit further includes a test module.

BACKGROUND OF THE INVENTION

Test procedures for transmitter-receiver circuits are known from the prior art. The purpose of these test procedures is to check, after certain steps of the manufacturing process and at the end of the manufacturing process, whether the circuit, still set on its silicon slice or wafer, is operating properly and whether the claimed features are actually present. Do to this, the circuits are thus removed from the production line to be placed in the test device(s). Electrodes are then arranged so that they are in contact with the contact terminals of the circuit. Then, various electric signals are applied to said circuit, via the electrodes, to start the transmitter-receiver circuit and thus test its features.

One drawback of these procedures is that they are expensive. Indeed, this drawback arises from the fact that existing devices for testing circuits on a wafer are used both to check whether the circuits are working and also whether the intrinsic features of the transmitter-receiver circuit comply with the theory. To do this, it is therefore necessary to have versatile devices that can test all of the features. This versatility means these devices require state of the art technology. This complexity and versatility therefore have repercussions on the selling price.

Moreover, the procedure in itself is expensive. The procedure and the devices used mean that the circuits are tested completely, i.e. all of the features of the circuit are tested to see whether the circuit meets the expected specifications. Consequently, with this procedure, it is not possible simply to check whether the circuit functions are working properly. The functions test necessarily goes through a complete circuit test. However, it is advantageous to test the functions at different stages of manufacture so as to detect faulty circuits earlier.

Thus, if all of the circuit features have to be tested at each circuit function test, this causes a not inconsiderable waste of time and therefore financial waste.

SUMMARY OF THE INVENTION

The invention concerns a method of testing the operation of a transmitter-receiver circuit that overcomes the aforementioned drawbacks of the prior art, i.e. an operation test method for a transmitter-receiver circuit that reveals whether or not the transmitter-receiver circuit is working and which is inexpensive and simpler.

The invention thus concerns the aforecited operation test method for a transmitter-receiver having a test module, whose the operation is independent on the emitting and receiving functionalities and being liable to test the emission and reception of said transmitter-receiver circuit, which is characterized in that it includes the steps consisting in:

a) electrically connecting the test module to the transmitter-receiver circuit processing unit;

b) testing the operation of the transmitter-receiver circuit in a first operating mode, which can be either a data transmission mode or a data reception mode, using the test module;

c) testing the operation of the transmitter-receiver circuit in a second operating mode, which is the inverse of the first operating mode, and which can be either a data reception mode or a data transmission mode, using the test module; and d) electrically disconnecting the test module from the processing unit.

Particular advantageous steps of the test method are defined in the dependent claims 2 to 9.

One advantage of the method according to the present invention is that it does not require the use of specific, complex tools. Indeed, the method according to the present invention uses a test module that is directly implemented in the transmitter-receiver circuit when the latter is being made, i.e. on the same silicon substrate.

It is this test module that will check whether the circuit is working or not. There is therefore no need to use an external device to test whether the transmitter-receiver circuit is working properly.

Advantageously, the omission of an external test device decreases the costs generated by a method of this type. Indeed, by dispensing with the external device and performing a prior test, the method according to the present invention removes the requirement for investment in an expensive device. Moreover, it allows faulty circuits to be easily identified before they are completely finished and thus reduces costs.

This method also has the advantage of being simple and direct, since the test result reveals whether the functions of the transmitter-receiver circuit are working or not and not whether theoretical features are present in practice. There is therefore no need to interpret the intrinsic circuit features to discover whether it is defective or not.

The invention also concerns a test module for a transmitter-receiver circuit whose particular feature is that it is integrated in the transmitter-receiver circuit presented above.

Advantageous embodiments of the test module form the subject of the dependent claims 11 to 12.

One advantage of the test module being directly implemented on the same substrate as the transmitter-receiver circuit is that the test module can be separated from said transmitter-receiver circuit. In fact, the arrangement of the test module is such that it is only connected to the transmitter-receiver circuit by two conductive paths. Thus, after the transmitter-receiver circuit test, the test circuit can be electrically or mechanically separated by a cutting operation, so as to separate the test module from the rest of the transmitter-receiver circuit. This thus saves surface space and prevents the test module from interfering with the operation of the transmitter-receiver circuit.

BRIEF DESCRIPTION OF THE DRAWINGS

The objects, advantages and features of the transmitter-receiver circuit operation test method and the associated test module will appear more clearly in the following detailed description of at least one embodiment of the invention, given solely by way of non-limiting example and illustrated by the annexed drawings, in which.

DETAILED DESCRIPTION

In the following description, all those parts of the transmitter-receiver circuit that are well known to those skilled in this technical field will be described only in a simplified manner.

Figure 1:
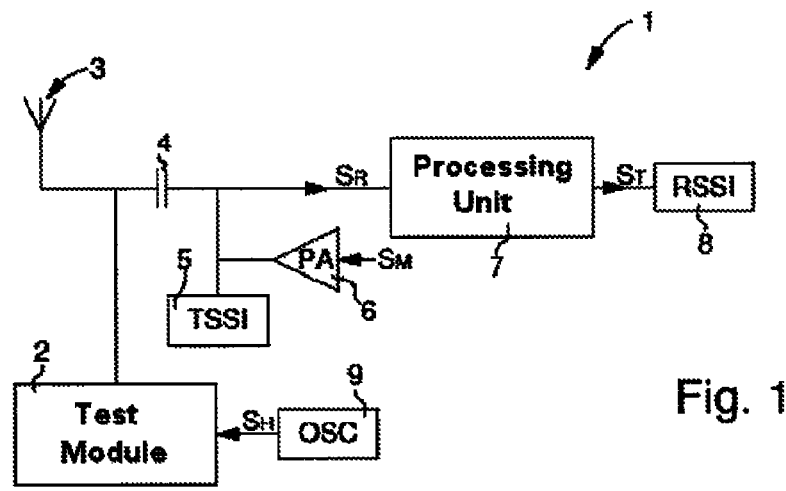
FIG. 1 shows schematically the transmitter-receiver circuit for implementing the test method according to the present invention.

FIG. 1 shows a diagram of the transmitter-receiver circuit for implementing the test method according to the present invention. Transmitter-receiver circuit 1 is thus arranged to use a communication protocol operating at a frequency of 2.4 GHz. Of course, another communication frequency could be envisaged.

Transmitter-receiver circuit 1 comprises first of all an antenna 3. This antenna may be an integrated antenna that can be disconnected via a switch or an external antenna connected to the input of a decoupling capacitor 4. The output of capacitor 4 is connected to an output of a power amplifier 6. The output of power amplifier 6 is also connected to a transmitted signal strength indicator (TSSI). The output of decoupling capacitor 4 is also connected to a processing unit 7 of transmitter-receiver circuit 1.

A received signal strength indicator (RSSI) 8, which, as its name suggests is used for measuring the strength of a received signal, is connected to the output of processing unit 7. Of course, since transmitter-receiver circuit 1 is not in itself the main subject of the present invention, its operation will not be described in further detail.

Figure 2:
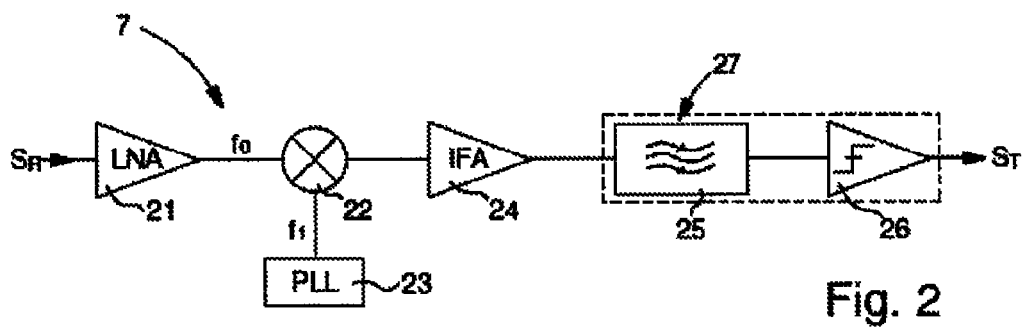
FIG. 2 shows schematically the test module for the transmitter-receiver circuit according to the present invention.

This processing unit 7, explained below with reference to FIG. 2, is used for processing the signal received by antenna 3 in order to read the data that it contains. It includes a first stage that takes the form of a low noise amplifier or preamplifier 21. The purpose of amplifier 21 is to shape the weak signals by selecting a particular frequency $f_0$ within the received signal frequency band and amplifying it. This particular frequency $f_0$ is generally the communication protocol frequency of said transmitter-receiver. The output of amplifier 21 is connected to a mixer 22 that mixes the amplified, selected signal $f_0$ leaving preamplifier 21 with a signal at frequency $f_1$ leaving a phase lock loop 23. The output of mixer 22 is used for supplying a frequency converted signal whose frequency may be lower than frequency $f_0$. The output of mixer 22 is connected to the input of an intermediate frequency amplifier 24, whose function is to amplify the frequency signal, whose frequency has been shifted. The mixer output is connected to a set including, for example, a band-pass filter 25 and a limiter amplifier 26, for respectively removing the interfering frequencies around the shifted frequency and converting the amplified sinusoidal signal into a square or pulse signal. Amplifier 26 thus behaves like a comparator with a threshold. Of course, the filters used in transmitter-receiver circuit 1 will be selected in accordance with the applications and frequency band used.

Figure 3:
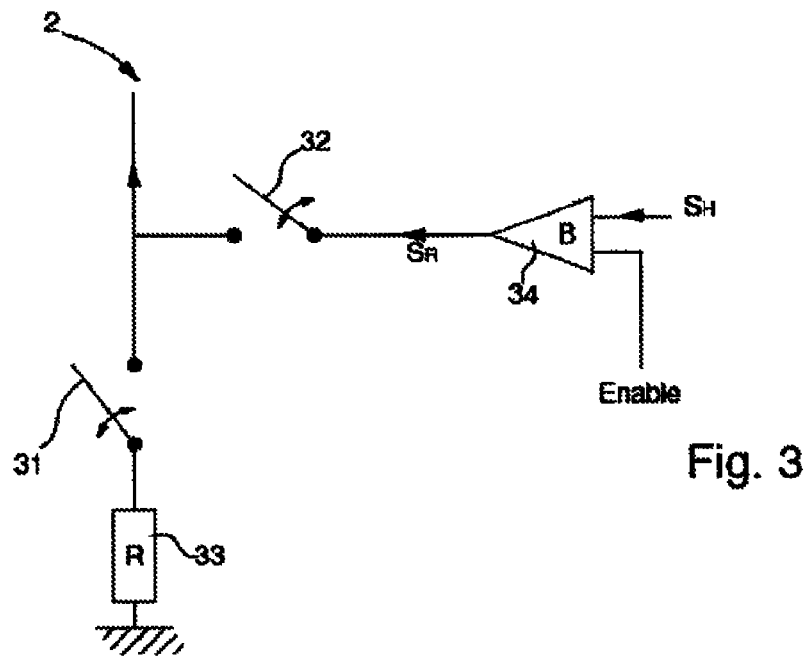
FIG. 3 shows schematically the processing unit of the transmitter-receiver circuit according to the present invention.

In addition to the elements belonging to transmitter-receiver circuit 1 shown in FIG. 1, transmitter-receiver circuit 1 also includes a test module 2, explained below with reference to FIG. 3. This test module 2 is connected, on the one hand, to the input of decoupling capacitor 4 and, on the other hand, to the output of quartz oscillator 9 that supplies the clock signal $S_H$ for said transmitter-receiver circuit 1. This clock signal $S_H$ has, for example, a frequency of 26 MHz. With reference to FIG. 3, test module 2, includes a tri-state buffer 34, a resistor 33 and two control means 31 and 32, such as switches, transistors or any other means that can have the same function. The output of quartz oscillator 9 is connected to an input of tri-state buffer 34. The output of tri-state buffer 34 is connected to the input of decoupling capacitor 4 via a first switch 32. Resistor 33 is placed between earth and a second switch 31, the latter also being connected to the input of decoupling capacitor 4. The value of resistor 33 must be calculated such that resistor 33 has a similar impedance to that of the antenna. For example, resistor 33 has a value of 50 Ohms.

With reference to FIGS. 1 to 3, during the transmitter-receiver circuit operation test, the first step consists in disconnecting antenna 3 from said transmitter-receiver circuit 1. This thus prevents antenna 3 from interfering with the test. This antenna will be disconnected for the entire duration of the test.

The following steps consist in testing the various operating modes of said transmitter-receiver circuit 1. In fact, transmitter-receiver circuit 1 operates in transmission or reception mode for respectively transmitting or receiving data. These operating modes thus use distinct parts of transmitter-receiver circuit 1.

The second step consists in testing whether transmitter-receiver circuit 1 is actually capable of transmitting data. To do so, a transmission simulation is performed by transmitting a power amplified signal $S_M$. To perform this simulation, the second switch 31 is set in the closed position, whereas first switch 32 is set in the open position. This allows resistor 33 to be electrically connected to decoupling capacitor 4. The transmission mode of transmitter-receiver circuit 1 is then switched on. Resistor 33, which is connected instead of the antenna, is then used to simulate the antenna impedance when data transmission is carried out. This means that power amplifier 6 can be tested to see whether it works. When transmitter-receiver circuit 1 transmits a signal, in this case signal $S_M$ from the modulation loop, the impedance of antenna 3 varies, thereby consuming power. Therefore, replacing antenna 3 with resistor 33 simulates the power consumption generated during transmission of a signal. The power is then measured by the transmitted signal strength indicator 5 located at the output of power amplifier 6. If the measured power is less than a certain predefined threshold, −20 dBm in this case, this means that transmitter-receiver circuit 1 is not capable of transmitting data and conversely, if the power achieves or exceeds this threshold, the transmission mode is working.

A third step consists in testing the reception mode of said transmitter-receiver circuit 1. To do so, the second switch 31 is set in the open position and first switch 32 is set in the closed position. This creates a connection between buffer 34 and decoupling capacitor 4. For the reception mode test, a signal is sent into processing unit 7 to test whether the latter is working. This signal, which is clock signal $S_H$ at frequency $f_H$, is then amplified by buffer 34. Buffer 34 amplifies the entire signal, i.e. not just the clock signal $S_H$, at frequency 26 MHz in our example, but also its harmonics.

For a 26 MHz signal, the first harmonic will typically be at frequency of 52 MHz, the second at 78 MHz and so on, i.e. in multiples of 26 MHz. We then discover a harmonic at around 2.4 GHz, which is the transmission and reception frequency $f_0$. This harmonic is used, since the signal strength is so low that it is not liable to cause any interference when it is amplified during the test. Of course, this is just a non-limiting example and consequently, other frequencies $f_0$ could be chosen in accordance with the features of transmitter-receiver circuit 1. Moreover, the frequency of clock signal $S_H$ is not limited to 26 MHz; the only restriction is that clock signal $S_H$ must have a harmonic within the transmitter-receiver circuit frequency band, i.e. 2.4 GHz in this case. Naturally, if the transmitter-receiver circuit is operating at another frequency, the clock signal must have a harmonic within that frequency band.

Amplified clock signal $S_H$ then enters processing unit 7, which includes, first of all, a low noise amplifier 21, which will amplify a particular frequency $f_0$ of signal $S_R$. This low noise amplifier 21 is adjusted to select and then amplify the harmonic within the 2.4 GHz frequency band of signal $S_R$. Then signal $S_R$ undergoes a frequency change via a mixer 22, which will mix signal $S_R$ at frequency $f_0=2.4$ GHz with a modulated signal at frequency $f_1$ from phase lock loop 23. The result is then a signal at frequency $f'=f_0-f_1$, which allows simpler amplification because of the lower signal spectrum frequency at the mixer output. This lower frequency allows the signal to be amplified with less interference. The signal is then amplified, filtered and shaped into a square signal to obtain signal $S_T$. Signal $S_T$ is the signal that will be demodulated so that the data can be read. The strength of signal $S_T$ is then measured by RSSI 8. This then reveals whether processing unit 7 is working as expected. In fact, a measured strength, which may be lower than a certain predefined threshold, −85 dbm in the present case, would mean that transmitter-receiver circuit 1 is not transmitting signals. This test thus easily indicates whether the reception loop is working.

A fourth step consists in setting the first and second switches 31, 32 in the open position to stop the test procedure. This allows test module 2 to be isolated from transmitter-receiver circuit 1 and thus prevents test module 2 being a source of interference. Of course, it is clear that the reception mode test can take place before the transmission mode test.

According to a first variant of the present invention, a fifth step may be provided, the purpose of which is to separate test module 2 from transmitter-receiver circuit 1. As previously stated, test module 2 is made at the same time and on the same substrate as transmitter-receiver circuit 1. This allows tests to be carried out on the same batch of transmitter-receiver circuits 1 at the same time. Thus, once the tests have been performed, test module 2 is no longer of use. This mechanical separation can be achieved by sawing, laser cutting or by any other cutting means capable of being used for this application. One advantage is that this step prevents test module 2 from interfering with transmitter-receiver circuit 1 and also saves surface space, thereby reducing the size of the circuit. Of course, RSSI 8 and TSSI 5 are not separated from transmitter-receiver circuit 1 during this step and can thus still be used again.

According to a second variant of the present invention, there may also be a sixth step, also optional, whose purpose is to test more specifically the features of transmitter-receiver circuit 1. Indeed, the test procedure according to the invention is used to check whether the functions of circuit 1 are working properly. This means testing whether circuit 1 can transmit and receive a signal via antenna 3. The tests proposed in this sixth, optional step thus consist in testing precisely the features of transmitter-receiver circuit 1 to see whether they comply with the theory.

It will be clear that various alterations and/or improvements and/or combinations that are evident those skilled in the art may be made to the various embodiments of the invention explained above without departing from the scope of the invention defined by the annexed claims.

What is claimed is:

1. A test method for a transmitter-receiver circuit including an antenna, which is connected to a processing unit arranged for receiving signals and converting the frequency of said signals, said transmitter-receiver circuit also including a power amplifier, which is connected to said antenna and arranged for sending transmission signals, said transmitter-receiver circuit further including a test module, whose the operation is independent on the emitting and receiving functionalities and being liable to test the emission and reception of said transmitter-receiver circuit, the method comprises the following steps:
   a) electrically connecting the test module to the processing unit of the transmitter-receiver circuit;
   b) testing the operation of the transmitter-receiver circuit in a first operating mode, which can be either a data transmission mode or a data reception mode, using the test module;
   c) testing the operation of the transmitter-receiver circuit in a second operating mode, which can be either a data reception mode or a data transmission mode, using the test module; and
   d) electrically disconnecting the test module from the processing unit.

2. The test method according to claim 1, wherein it further includes, prior to step a), the step of disconnecting the antenna.

3. The method according to claims 1, wherein said test module is integrated in the processing unit.

4. The method according to claim 1, wherein the operation test of the transmitter-receiver circuit in transmission mode includes the following steps:
   connecting a resistor connected to earth instead of the antenna; and
   measuring the transmitted power using a transmitted signal strength indicator.

5. The method according to claim 1, wherein the operation test of the transmitter-receiver circuit in reception mode includes the following steps:
   injecting a signal at a predefined basic frequency $f_t$ via the antenna connection terminal;
   selecting and amplifying a frequency harmonic $f_0$ of the signal at a predefined frequency to supply an amplified signal at frequency $f_0$;
   performing a frequency change by changing from the amplified signal frequency $f_0$ to an intermediate signal at frequency $f_0 - f_1$ using a mixer and a reference signal at frequency $f_1$;
   filtering said intermediate signal to remove interference; and
   measuring the strength of said intermediate signal using a measuring device (8).

6. The method according to claim 5, wherein the predefined frequency $f_t$ is the clock frequency of the transmitter-receiver circuit.

7. The method according to claim 5, wherein the value of the selected harmonic frequency $f_0$ is 2.4 GHz.

8. The method according to claim 1, wherein it further includes step e) of mechanically separating the test module from the transmitter-receiver circuit test module.

9. The method according to claim 1, wherein it further includes a final step of testing all the features of the transmitter-receiver circuit using an external test device.

10. The test module for a transmitter-receiver circuit, wherein the test module is for receiving a signal at a defined frequency at one input, the module input being connected to amplifier means which are connected to an output of the module via first control means, said module further including a resistor, which is connected to earth and also to the output via second control means, said output being connected to the processing unit of the transmitter-receiver circuit.

11. The module according to claim 10, wherein the signal at a defined frequency is the clock signal of the transmitter-receiver circuit.

12. The module according to claim 10, wherein the first and second control means are configured such that they are not in a state where the current can pass through said means at the same time.

* * * * *